(12) United States Patent
Cheng et al.

(10) Patent No.: US 7,561,431 B2
(45) Date of Patent: Jul. 14, 2009

(54) DOUBLE HOUSING MUTUALLY STACKING STRUCTURE

(75) Inventors: Sheng-Hsiung Cheng, Taipei Hsien (TW); Te-An Lin, Taipei Hsien (TW); Wu-Nan Wang, Taipei Hsien (TW); Chia-Chia Huang, Taipei Hsien (TW)

(73) Assignee: AOPEN Inc., Hsichih (TW)

( * ) Notice: Subject to any disclaimer, the term of this patent is extended or adjusted under 35 U.S.C. 154(b) by 50 days.

(21) Appl. No.: 11/896,280

(22) Filed: Aug. 30, 2007

(65) Prior Publication Data

US 2009/0059503 A1 Mar. 5, 2009

(30) Foreign Application Priority Data

Sep. 20, 2006 (KR) .............................. 95216804 U

(51) Int. Cl.
*H05K 5/00* (2006.01)
*A47B 81/00* (2006.01)

(52) U.S. Cl. ................ 361/724; 312/223.2; 361/679.02

(58) Field of Classification Search ......... 361/724–725, 361/679, 683, 386; 312/223.1, 223.2, 107, 312/108; 174/50, 17 R, 520, 559–561; 29/446, 29/452–453, 559, 428, 434, 469; 269/48.1, 269/287, 909

See application file for complete search history.

(56) References Cited

U.S. PATENT DOCUMENTS

2003/0011976 A1 * 1/2003 Treiber et al. ............... 361/683
2005/0207103 A1 * 9/2005 Russo ........................ 361/683

* cited by examiner

*Primary Examiner*—Jayprakash N Gandhi
*Assistant Examiner*—Nidhi Desai

(57) ABSTRACT

A double housing mutually stacking structure comprises first and second housing. The first and second housing are respectively constituted at least by first and second motherboard blocking walls, first and second front walls, first and second rear walls, a first upper cover and a second lower cover. When the housing is packed, the first front wall is propped against an outer side of the second rear wall, the second front wall is propped against an outer side of the first rear wall, the first upper cover is propped against upper edges of the second rear wall and the second motherboard blocking wall, and the second lower cover is propped against lower edges of the first rear wall and the first motherboard blocking wall to cause the first and the second housing to be mutually stacked to be close to the volume of one housing to be transported.

15 Claims, 5 Drawing Sheets

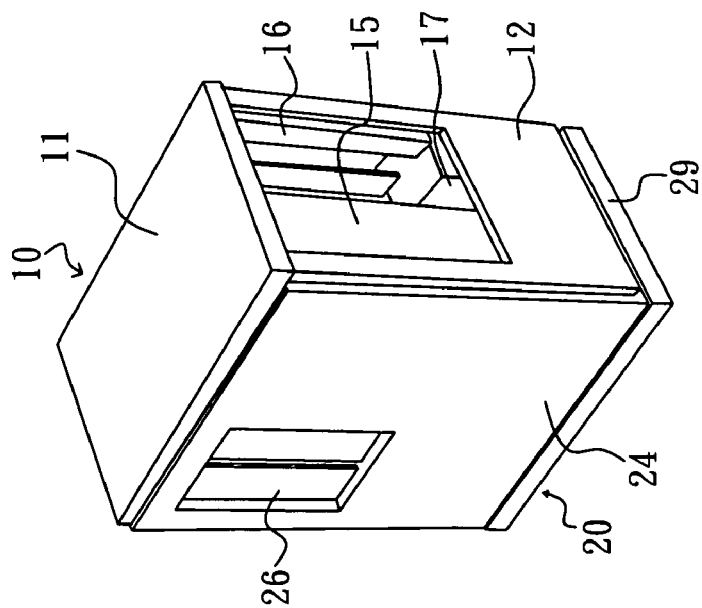
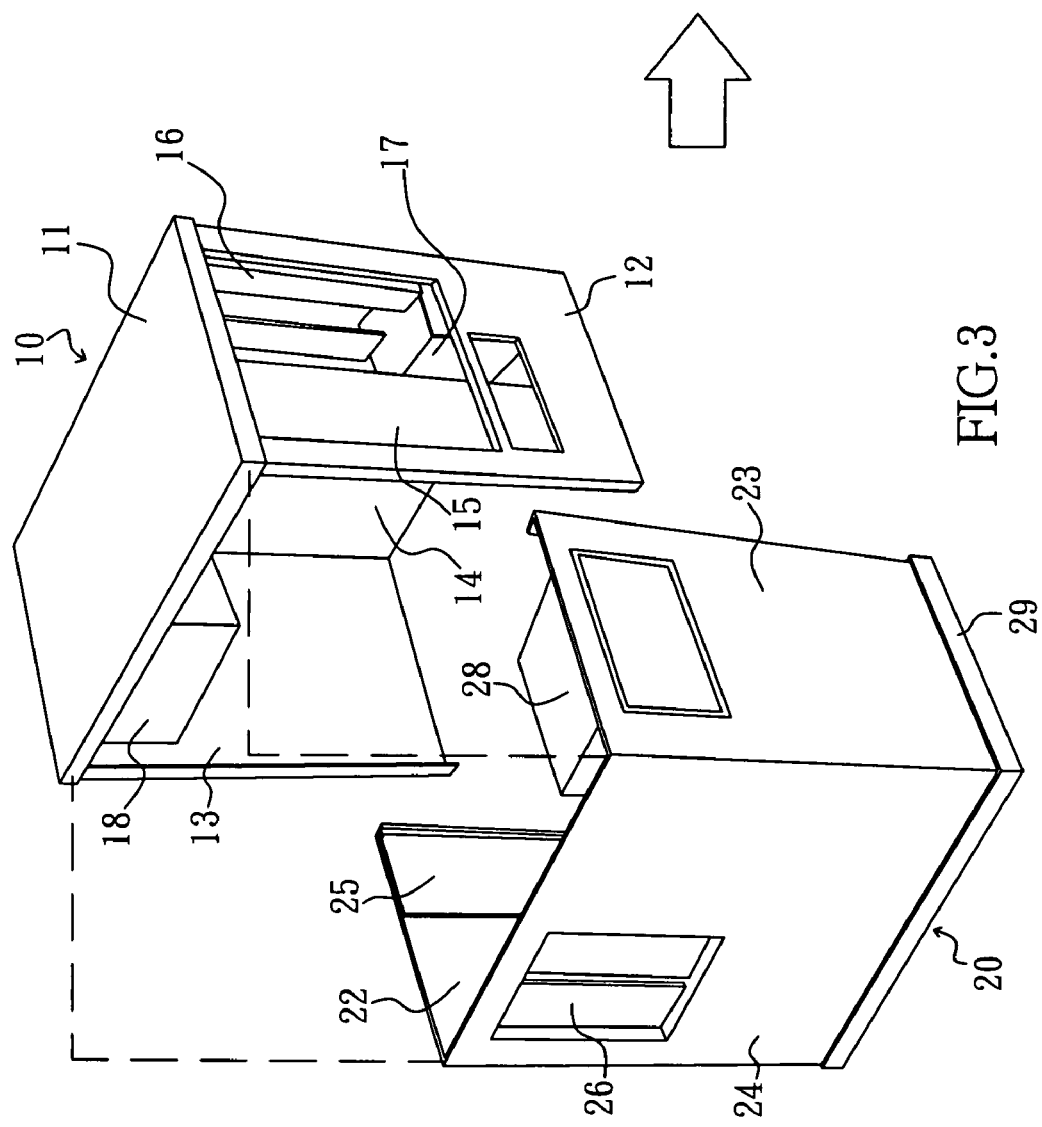

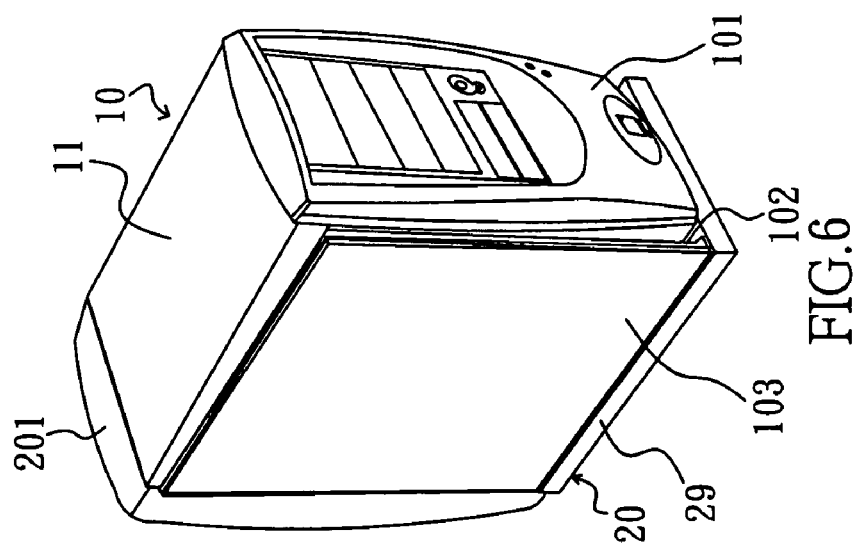
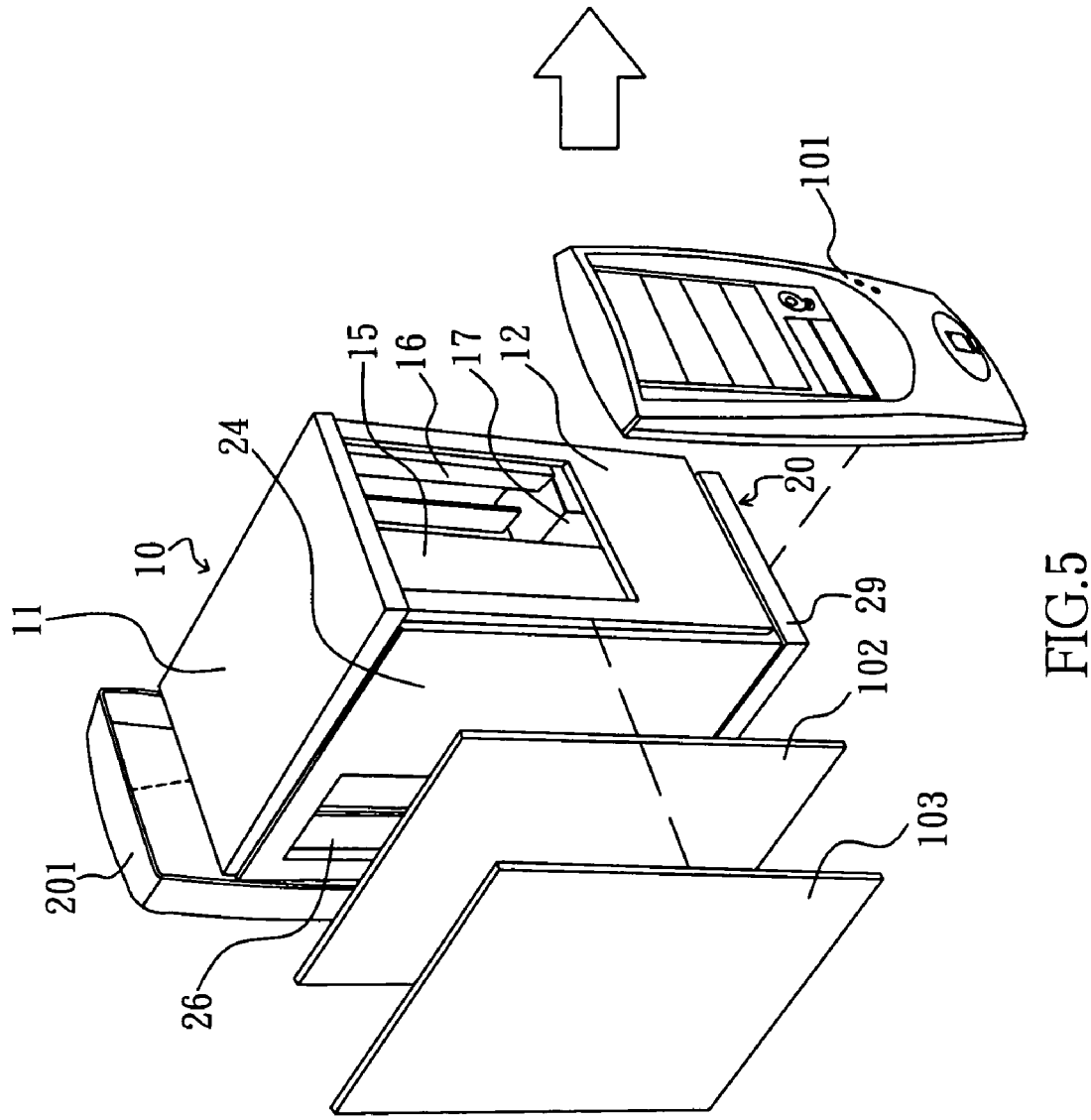
FIG.5
FIG.6

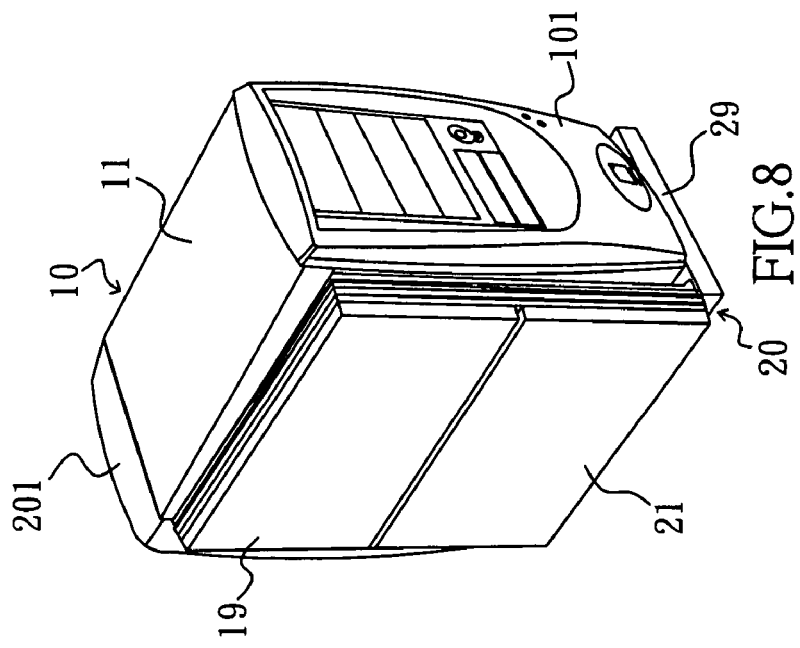
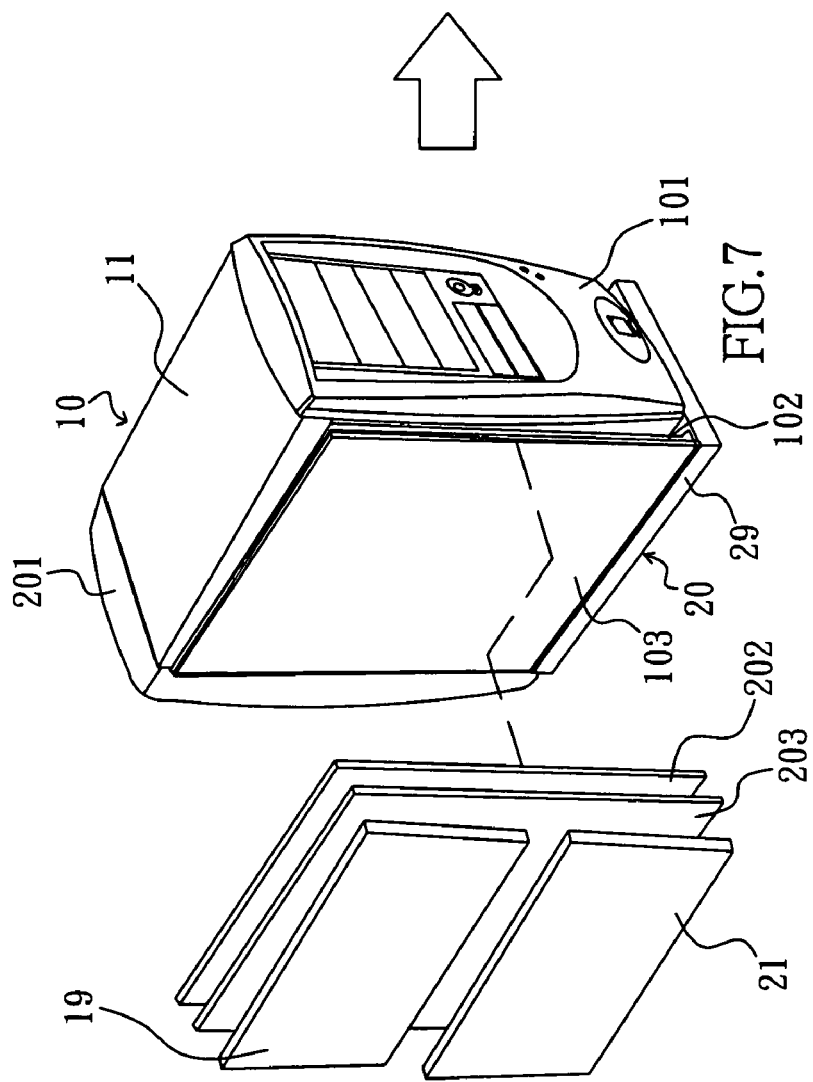

DOUBLE HOUSING MUTUALLY STACKING STRUCTURE

BACKGROUND OF THE INVENTION

1. Field of the Invention

The present invention relates to a housing structure of a personal computer, and more particularly to a housing structure of a computer capable of saving the transportation and the packing material costs.

2. Description of Related Art

Currently, selling a computer housing is highly competitive and lowly profitable. Therefore, decreasing the cost of the housing material and lowering down the transportation and the packing material costs can increase the competition ability.

For saving the transportation cost, there are some technologies are developed. For example, Taiwan Patent No. 447,719 disclose a structure capable of detaching a computer housing into a several parts and then combining the parts together to be an integral; Taiwan Patent No. 468,811 discloses a sectional industrial computer housing; Taiwan Patent No. 474,423 discloses a tool-free detachable computer housing structure; Taiwan Patent No. 490,123 discloses a sectional computer housing; Taiwan Patent No. 531,142 discloses a sectional housing structure.

Each sectional computer housing mentioned above is allowed to separate into a several components. But, because the components are too many, it is time-consuming to assemble them into a computer housing and the scattering components are also hard to be collected to be a packed-to-be body.

SUMMARY OF THE INVENTION

For allowing two computer housings to be stacked to be close to a volume of one computer housing while being transported so as to be able to effectively save the transportation space and the packing material cost, the present invention is proposed.

The main object of the present invention is to provide a double housing mutually stacking structure, used for allowing two computer housing to be stacked to be close to a volume of one computer housing to be transported, and capable of saving the transportation cost and elevating the product competition.

Another object of the present invention is to provide a double housing mutually stacking structure, used for allowing two housing to be stacked to be a packed-to-be body with a shrunken volume to benefit saving storage space.

For attaining to the objects mentioned above, a double housing mutually stacking structure used for allowing two computer housing to be stacked to be close to the volume of one computer housing comprises:

a first motherboard blocking wall;

a first front wall, a first side edge thereof is combined with a front edge of the first motherboard blocking wall;

a first rear wall, a first side edge thereof is combined with a rear edge of the first motherboard blocking wall;

at least one of a first upper cover and a first lower cover, the first upper cover and the first lower cover are respectively combined with upper and lower edges of the first motherboard blocking wall, the first front wall and the first rear wall so as to constituted a first main structure of a first housing;

Whereby, the first housing and another second housing with the same structure are allowed to mutually stack. The second housing is provided with a second main structure corresponding to the first main structure of the first housing. The second main structure is provided with a second motherboard blocking wall, a second front wall, a second rear wall, a second upper cover and a second lower cover respectively corresponding to the first motherboard blocking wall, the first front wall, the first rear wall, the first upper cover and the first lower cover. When the first housing and the second housing are caused to mutually stack, the first main structure is first allowed to have the first upper cover and to be lack of the first lower cover, and the second main structure is allowed to have the second lower cover and be lack of the second upper cover. Thereafter, the first front wall is allowed to prop against an outer side of the second rear wall, the second front wall is allowed to prop against an outer side of the first rear wall, the first upper cover is allowed to prop against upper edges of the second rear wall and the second motherboard blocking wall and the second lower cover is allowed to prop against lower edges of the first rear wall and the first motherboard blocking wall to enable the first main structure and the second main structure to be mutually stacked to be a packed-to-be body; this allows two computer housing to be stacked to be close to the volume of one housing to be transported. Therefore, the transportation and the packing material costs can be effectively saved, the product competition ability can be elevated and the storage space can be saved.

BRIEF DESCRIPTION OF THE DRAWINGS

The present invention can be more fully understood by reference to the following description and accompanying drawings, in which:

FIG. 3 is a schematic view, showing a double housing mutually stacking structure of a preferred embodiment according to the present invention in which a first main structure and a second main structure are separated;

FIG. 4 is a schematic view, showing a double housing mutually stacking structure of a preferred embodiment according to the present invention in which a first main structure and a second main structure are collected together;

FIG. 5 is a schematic view, showing a double housing mutually stacking structure of a preferred embodiment according to the present invention in which a first right side plate, a first left side plate, a first panel and a second panel are separated from a contracted structure shown in FIG. 4;

FIG. 6 schematic view, showing a double housing mutually stacking structure of a preferred embodiment according to the present invention in which front walls, rear walls and side walls are expanded;

FIG. 7 is a schematic view, showing a double housing mutually stacking structure of a preferred embodiment according to the present invention in which a first upper cover and a second upper cover are separate from a stacked structure shown in FIG. 6; and FIG. 8 is a schematic view, showing a stacking procedure of a double housing mutually stacking structure of a preferred embodiment according to the present invention.

DETAILED DESCRIPTION OF THE PREFERRED EMBODIMENTS

Figure 1:
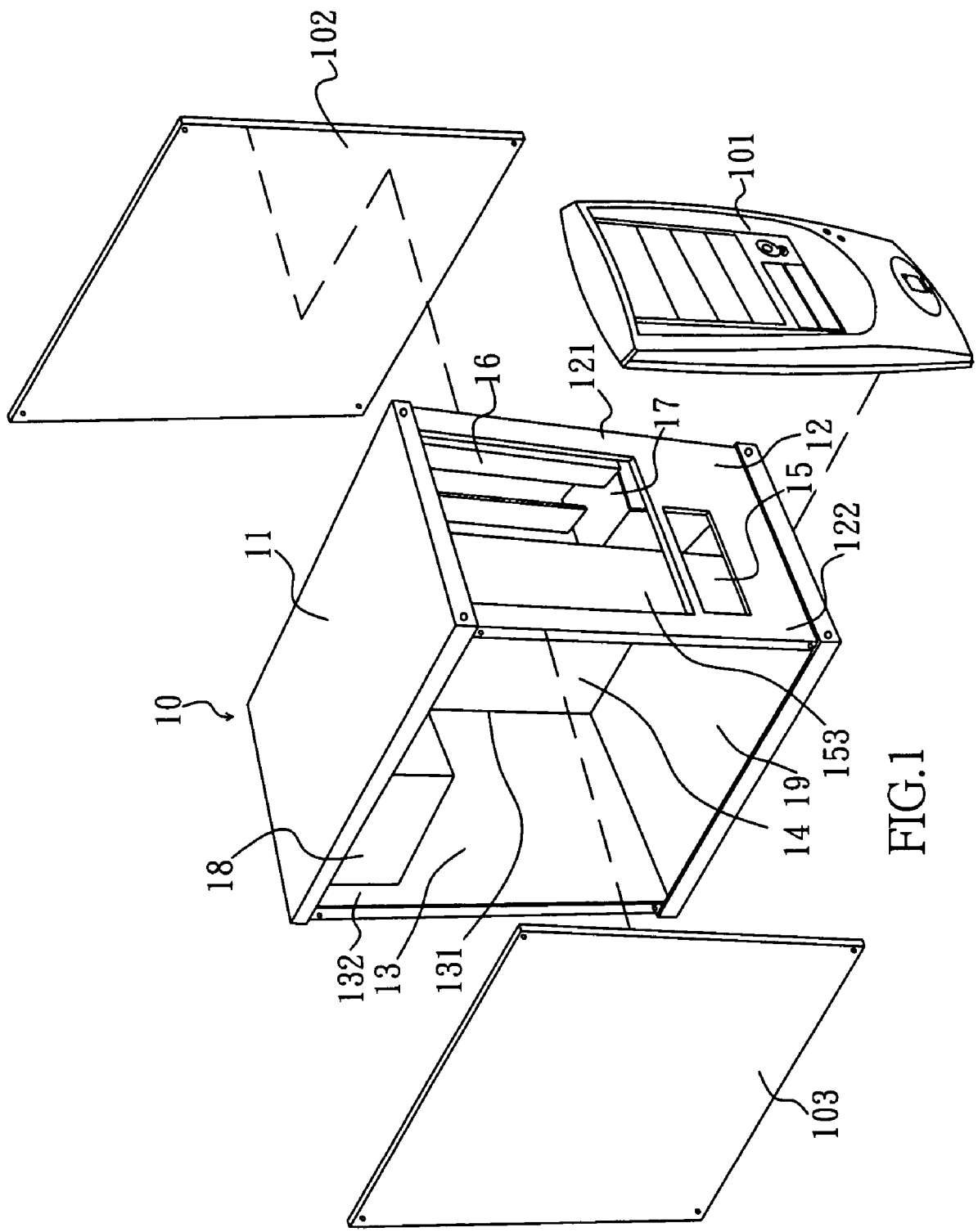
FIG. 1 is a schematic view, showing a double housing mutually stacking structure of a preferred embodiment according to the present invention in which a part of elements are separated from a computer housing.
Figure 2:
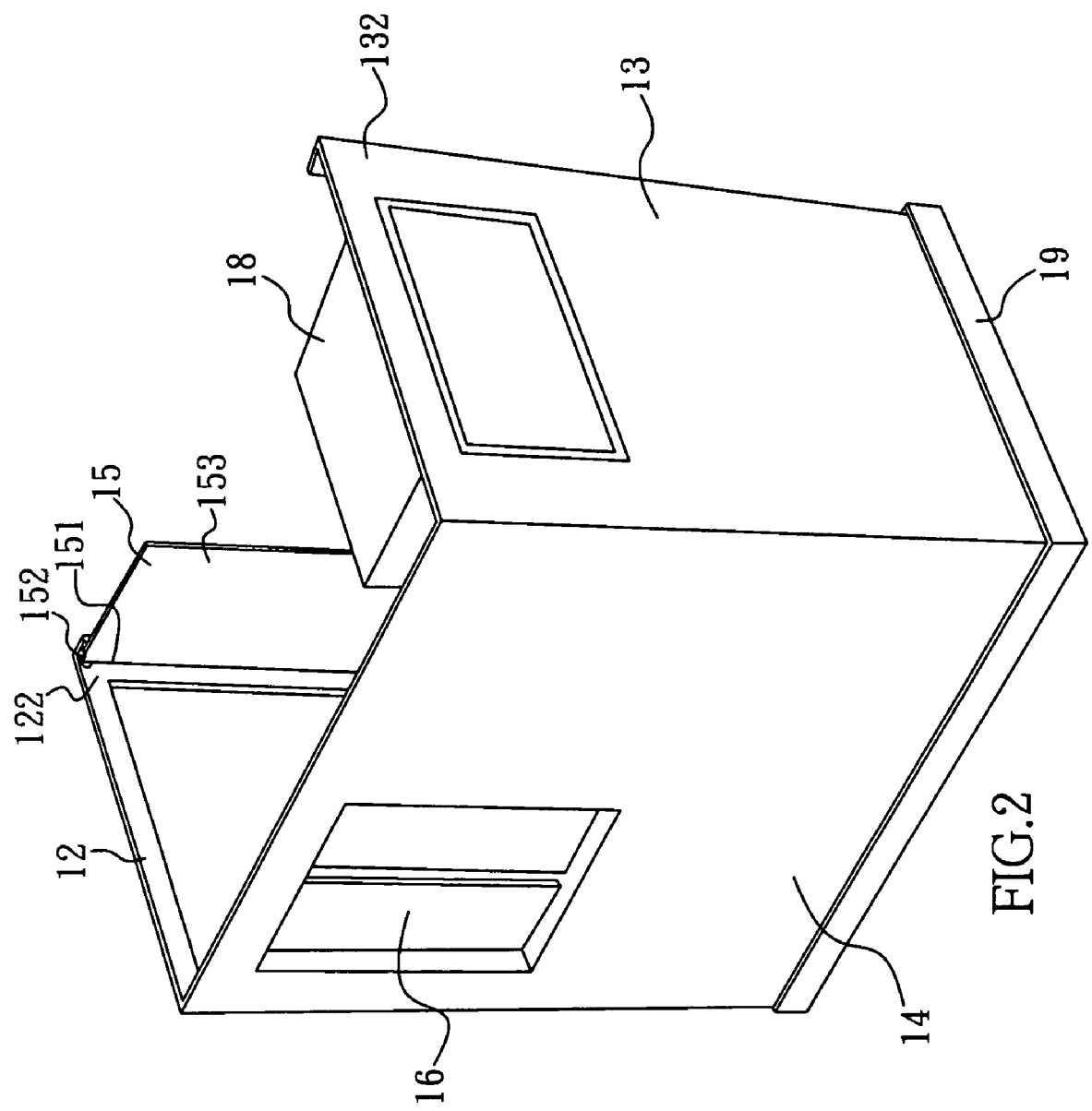
FIG. 2 is a schematic view, showing a double housing mutually stacking structure of a preferred embodiment according to the present invention in which a upper cover is detached and a first supporting frame is opened.

Please refer to FIGS. 1 and 2. A double housing mutually stacking structure of a preferred embodiment according to the present invention is used for allowing two computer housings to be stacked to be close to the volume of one computer housing. A double housing mutually stacking structure of the present embodiment comprises a first main structure 10, a first panel 101, a first right side plate 102 and a first left side plate 103, in which the first main structure 10 comprises a first upper cover 11, a first front wall 12, a first rear wall 13, a first motherboard blocking wall 14, a first left supporting frame 15, a first right upper supporting frame 16, a first right lower supporting frame 17, a first power supply 18 and a first lower cover 19.

The present invention is characterized in that the upper cover and the lower cover of the main structure are detachable, and the panel, the right side plate and the left side plate are detachably combined with the main structure. When two computer housing want to be stacked to be close to the volume of one computer housing, the first panel, the first right side plate and the first left side plate are respectively detached from the computer housing, and the upper cover is caused to detached from one of the main structure, and the lower cover is caused to detach from another one of the main structures. Thereafter, the computer housings are allowed to be stacked together.

The first side edges 121 and 131 of the first front and the first rear walls 12 and 13 are respectively combined to front and rear edges of the first motherboard blocking wall 14. The first front and rear walls 12 and 13 and upper and lower edges of the first motherboard blocking wall 14 are respectively combined with the first upper cover 11 and the first lower cover 19. A first side edge 151 of the first left supporting frame 15 is pivotally connected to a second side edge 122 of the first front wall 12 through a first hinge 152 as FIG. 2 shows. The first right upper supporting frame 16 and the first right lower supporting frame 17 are respectively combined with an inner side of the first motherboard blocking wall 14. The first right upper supporting frame 16 is located above the first right lower supporting frame 17. Finally, the first power supply 18 is combined with an upper edge of an inner side of the first rear wall 13.

When the first main structure 10 is contracted, a second side edge 153 of the first left supporting frame 15 is propped against the first front wall 12 as FIG. 1 shows. When the main structure 10 is expanded, the second side edges 153 of the first left supporting frame 15 is expanded to a position opposite to a second side edge 132 of the first rear wall 13 as FIG. 2 shows. In the meantime, the first left supporting frame 15 is opposite to the first right upper supporting frame 16 and the first right lower supporting frame 17. A space between the first left supporting frame 15 and the first right upper supporting frame 16 is used for accepting a first kind electronic device such as a 5.25 inch CD-ROM drive and a space between the first left supporting frame 15 and the first right lower supporting frame 17 is used for accepting a second kind electronic device such as a 3.50 inch CD-ROM drive.

Furthermore, the first panel 101 is caused to combine with a front side of the first front wall 12, the first right side plate 102 is caused to combine with an outer side of the first motherboard blocking wall 14 and the first left side plate 103 is caused to combine with the second side edges 122 and 132 of the first front wall 12 and the first rear wall 13 to constitute a first housing.

Each component of the present embodiment can be allowed to combine with another component by passing screws through corresponding holes on each component. Besides, corresponding holes and tenons on each component and another component can be used for engaging with one another to combine each component with another component.

The first wall 12, the first rear wall 13 and the first motherboard blocking wall 14 can be manufacturing from a plate.

Please refer to FIGS. 1 and 3. When the embodiment is taken into practice, the first main structures 10 of two housing are mutually stacked to a unity. For describing conveniently, name another housing as a second housing. The second housing has the same structure as the first housing. For describing clearly, take corresponding assigned number to express a corresponding element. For example, a front wall 22, a second left supporting frame 25 and a second right upper supporting frame 26 of a second main structure 20 are corresponding to the front wall 12, the first left supporting frame 15 and the first right upper supporting frame 16 of the first main structure 10.

Please refer to FIGS. 1 and 3 to 8. When an operator wants to stack the first housing to the second housing, he first detaches the first lower cover 19 from the first main structure 10, detaches a second upper cover 21 from the second main structure 20, presses the first left supporting frame 15 against the first front wall 12 and presses the second left supporting frame 25 against the second front wall 22 as FIG. 3 shows. When an assembly is being processed, the operator presses the first front wall 12 against an outer side of a second rear wall 23, the second front wall 22 against an outer side of the first rear wall 13, the first upper cover 11 against upper edges of the second rear wall 23 and a second motherboard blocking wall 24, a second lower cover 29 against lower edges of the first rear wall 13 and the first motherboard blocking wall 14 so as to cause the first main structure 10 and the second main structure 20 to be mutually stacked to be a unity as FIG. 4 shows. Furthermore, the operator engages the first panel 101 and a second panel 201 respectively with the first front wall 12 and the second front wall 22, and stacks the first right side plate 102 and the first left side plate 103 to an outer side of the second motherboard blocking wall 24 as FIGS. 5 and 6 show. Next, the operator stacks the second right side plate 202 and the second left side plate 203 to one side of the first left side plate 103 and then arranges the first lower cover 19 and the second upper cover 21 to be up and down and side by side and stacks them to one side of the second left side plate 203. Finally, the first housing and the second housing can be allowed to mutually stack together to be a packed-to-be body, and the volume of the packed-to-be body is approximately equal to the one of the first housing.

The double housing mutually stacking structure disclosed in the present invention allows two computer housings to be stacked to be close to the volume of one housing to transport so that the transportation cost can be effectively saved, the product competition ability can be elevated and the storage space can be favorably saved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A double housing mutually stacking structure, used for allowing two computer housing to be stacked to be close to the volume of one housing, comprising:
a first motherboard blocking wall;
a first front wall, a first side edge thereof being combined with a front edge of said first motherboard blocking wall;
a first rear wall, a first side edge thereof being combined with a rear edge of said first motherboard blocking wall;
at least one of a first upper cover and a first lower cover, said first upper cover and said first lower cover being respectively combined with said first motherboard blocking wall, said first front wall and upper and lower edges of said first rear wall to constitute a first main structure of a first housing;
whereby, said first housing and a second housing with the same structure as said first housing are allowed to mutually stack to each other, said second housing is provided with a second main structure corresponding to said first main structure of said first housing; said second main structure is provided with a second motherboard blocking wall, a second front wall, a second rear wall, a second upper cover and a second lower cover respectively corresponding to said first motherboard blocking wall, said first front wall, said first rear wall, said first upper cover and said first lower cover;
when said first housing and said second housing are caused to mutually stack, said first main structure is allowed to have said first upper cover and be lack of said first lower cover, said second main structure is allowed to have said second lower cover and be lack of said second upper cover, said first front wall is allowed to prop against an outer side of said second rear wall, said second front wall is allowed to prop against an outer side of said first rear wall, said first upper cover is allowed to prop against upper edges of said second rear wall and said second motherboard blocking wall and said second lower cover is allowed to prop against lower edges of said first rear wall and said first motherboard blocking wall to cause said first main structure and said second main structure to be mutually stacked to be a packed-to-be body.

2. The double housing mutually stacking structure according to claim 1, further comprising a second housing; said second housing having the same structure as said first housing.

3. The double housing mutually stacking structure according claim 1, wherein said main structure further comprises a first power supply, said first power supply is combined with an inner side of said first rear wall.

4. The double housing mutually stacking structure according to claim 3, further comprising a second housing, said second housing having the same structure as said first housing.

5. The double housing mutually stacking structure according claim 3, wherein said first main structure further comprises a first left supporting frame, a first right upper supporting frame and a first right lower supporting frame; a first side edge of said first left supporting frame is pivotally connected to a second side edge of said first front wall through a first hinge; said first right upper supporting frame and said first right lower supporting frame are respectively combined with an inner side of said first motherboard blocking wall; said first right upper supporting frame is positioned above said first right lower supporting frame; before said first main structure and said second main structure are caused to mutually stack, said left supporting frame is allowed to prop against said first front wall and said second left supporting frame is allowed to prop against said second front wall; when said first left supporting frame is expanded, a space between said first left supporting frame and said first right upper supporting frame is used for accepting a first kind electronic device, and a space between said first left supporting framed and said first right lower supporting frame is used for accepting a second kind electronic device.

6. The double housing mutually stacking structure according to claim 5, further comprising a second housing; said second housing having the same structure as said first housing.

7. The double housing mutually stacking structure according claim 5, wherein said first housing further comprises a first lower cover.

8. The double housing mutually stacking structure according to claim 7, further comprising a second housing; said second housing having the same structure as said first housing; said second housing further comprising a second upper cover.

9. The double housing mutually stacking structure according to claim 7, wherein said first housing further comprises a first right side plate; whereby, when said first housing is assembled, said first right side plate is allowed to combine respectively with right sides of said first front wall and said first rear wall.

10. The double housing mutually stacking structure according claim 9, further comprising a second housing; said second housing having the same structure as said first housing; said second housing further comprising a second right side plate.

11. The double housing mutually stacking structure according to claim 9, wherein said first housing further comprises a first left side plate; whereby, when said first housing is assembled, said first left side plate is allowed to combine respectively with left sides of said first front and wall said first rear wall.

12. The double housing mutually stacking structure according to claim 11, further comprising a second housing, said second housing having the same structure as said first housing; said second housing further comprising a second left side plate.

13. The double housing mutually stacking structure according claim 11, wherein said first housing further comprises a first panel; whereby, when said first housing is assembled, said first panel is allowed to combine with a front side of said first front wall.

14. The double housing mutually stacking structure according claim 13, wherein said first front wall, said first rear wall and said first motherboard blocking wall are formed by a plate.

15. The double housing mutually stacking structure according to claim 14, further comprising a second housing, said second housing having the same structure as said first housing; said second housing further comprising a second panel; when said first housing and said second housing are caused to mutually stack to be a packed-to-be body, said first panel and said second panel being further allowed to respectively engage with said first front wall and said second front wall, and said first right side plate and said first left side plate being allowed to stack to an outer side of said second motherboard blocking wall; said second right side plate and said second left side plate being then allowed to stack to one side of said first left side plate; said first lower cover and said second upper cover being arranged up and down and side by side to stack to one side of said second left side plate.

* * * * *